United States Patent [19]
Pooley et al.

[11] Patent Number: 6,038,868
[45] Date of Patent: Mar. 21, 2000

[54] FREEZER APPARATUS

[75] Inventors: Michael B. Pooley, London; Carl N. Strotton, Bognor Regis, both of United Kingdom; David G. Wardle, Bridgewater, N.J.

[73] Assignee: The BOC Group plc, Windlesham, United Kingdom

[21] Appl. No.: 09/062,603

[22] Filed: Apr. 17, 1998

[30] Foreign Application Priority Data

Apr. 28, 1997 [GB] United Kingdom ............... 9708496

[51] Int. Cl.⁷ .................................................. F25D 13/06
[52] U.S. Cl. ................... 62/63; 62/65; 62/374; 62/380; 62/381
[58] Field of Search ............................. 62/63, 380, 381, 62/374, 65

[56] References Cited

U.S. PATENT DOCUMENTS 4,947,654  8/1990  Sink et al. ................... 62/381 X
5,410,886  5/1995  Wallace et al. .................... 62/63

Primary Examiner—Ronald Capossela
Attorney, Agent, or Firm—William A. Schoneman; Salvatore P. Pace

[57] ABSTRACT

Apparatus and methods for freezing products, such as food products, in which a breathable liquid cryogen is sprayed onto the products as they are conveyed into the insulated enclosure of a mechanical conveyor freezer. Some of the cryogen vaporized through contact with the products is ducted into the top of the enclosure, and means may be provided for spraying cryogen directly into the freezer enclosure.

10 Claims, 2 Drawing Sheets

FREEZER APPARATUS

This invention relates to an apparatus for and a method of freezing products, particularly but not exclusively food products.

BACKGROUND OF THE INVENTION

Conventional freezers for freezing large numbers of discrete items, such as food products, generally comprise a conveyor for carrying the discrete items into a freezing region, where the items remain for a predetermined period of time sufficient for them to be frozen to the desired degree, the frozen items then being conveyed out of the freezer. In such continuous freezing systems, the individual items are usually conveyed continuously into, through and out of an insulated container which is maintained at a low temperature, the individual items being frozen through contact with the low temperature atmosphere within the enclosure. In order to maintain the necessary dwell time, i.e. the time each item remains within the low temperature atmosphere, whilst maximizing the rate of product throughput and minimizing the space taken up by the system, such freezers generally comprise helical or spiral conveyors, such as that disclosed in U.S. Pat. No. 3,315,492.

A problem with such known mechanical freezers is that they are designed to freeze a maximum product throughput. Hence, they operate most efficiently at maximum throughput, but are inefficient at any other rate of throughput. Accordingly, such mechanical freezers are inflexible, since they cannot allow for changes in ambient temperature nor for variations in product throughput. Moreover, all such mechanical freezers become less efficient over time, with the consequence that the rate of maximum product throughput for optimal freezer performance gradually decreases. These disadvantages of prior art freezers are at least ameliorated and possibly eliminated in accordance with the present invention.

SUMMARY OF THE INVENTION

In one aspect, the present invention provides an apparatus for freezing food products comprising an insulated enclosure, means for maintaining the interior of the enclosure below ambient temperature and means for conveying products through the enclosure via an inlet and an outlet thereof so as to reduce the product temperature, wherein means are provided for spraying the products with a breathable liquid cryogen at the enclosure inlet.

In a second aspect the present invention provides a method of freezing products comprising spraying a breathable liquid cryogen onto the products as they are conveyed, through a spray zone, into the insulated enclosure of a mechanical conveyor freezer. Very preferably at least some of the cryogen which is vaporized through contact with the products in the spray zone is directed into the enclosure for circulation therein.

DETAILED DESCRIPTION OF THE INVENTION

Figure 1:
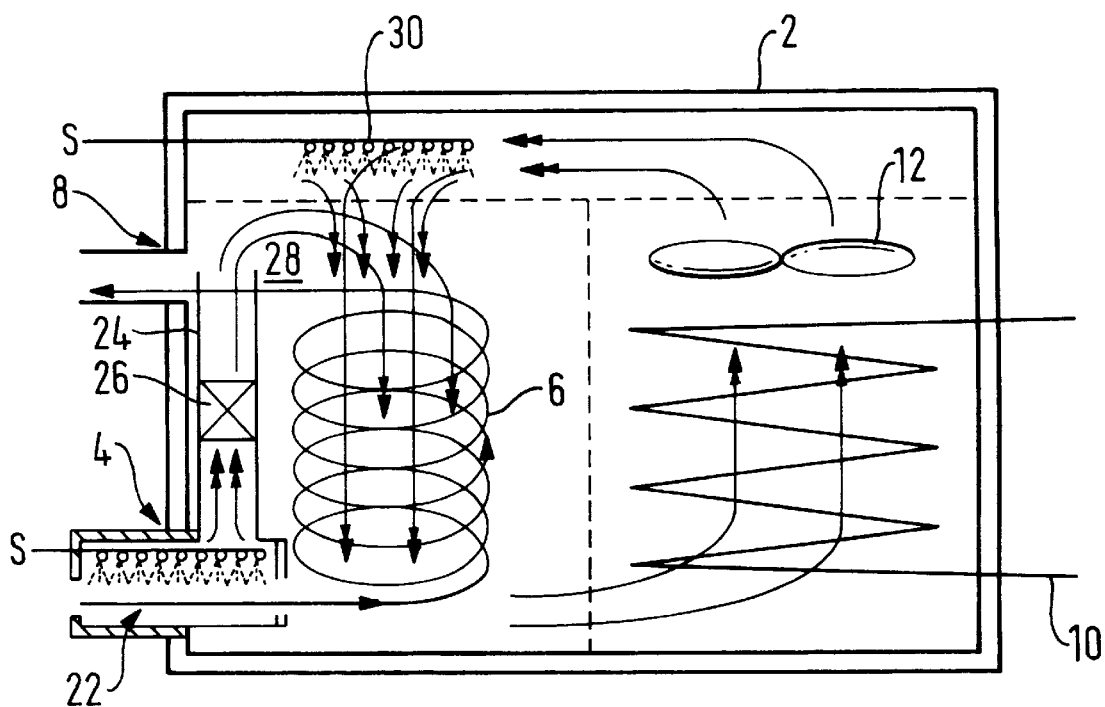
FIG. 1 is a schematic diagram of an apparatus in accordance with the invention.

The present invention provides an improvement in conventional mechanical freezers which are typically comprised of an insulated enclosure having means for conveying the products to be frozen therethrough and means for maintaining the temperature within the enclosure below ambient temperature. In accordance with the present invention, a breathable liquid cryogen is sprayed directly onto the product at the inlet to the insulated enclosure. Spraying a liquid cryogen directly onto the product causes the liquid to vaporize and "crust freezes" the surface of the product. Vaporizing the liquid cryogen on the surface of the product removes the latent heat energy of the liquid cryogen from the product which increases the freezing capacity of the freezer. Crust freezing also helps retain any moisture in the product, thereby reducing the dehydration losses associated with mechanical refrigeration as achieved by conventional freezers by up to 3% of product weight. The breathable liquid cryogen is preferably a mixture of liquid oxygen and liquid nitrogen with an oxygen concentration similar to that of air, i.e. between about 14 mol % and 21 mol % oxygen, the remainder being nitrogen, since this allows an operator to enter the freezer without requiring breathing or other safety equipment.

Preferably a canopy is installed at the inlet to the enclosure and defines a liquid cryogen spray zone, the cryogen spray means being disposed within the canopy and adapted to spray the products with the cryogen as they are conveyed through the spray zone and into the enclosure. As the liquid cryogen comes into contact with the product, at least some of the liquid cryogen is vaporized. Advantageously, means are provided for directing at least some of the cryogen vaporized after coming into contact with the product so as to introduce it directly into the enclosure. Utilizing the vaporized cryogen evolved in the spray zone in this manner increases the freezing capacity, and hence the maximum product throughput of the freezer.

The vaporized cryogen which is directed into the enclosure is preferably introduced adjacent the outlet thereof. Such an arrangement, which is conveniently achieved by providing a variable speed fan housed in ducting located within the enclosure, and leading from the spray zone to a point positioned adjacent the enclosure outlet, brings the cold cryogen vapor into contact with the products immediately prior to their egress from the enclosure (ie when the products are at or approaching the desired low temperature). Since it is typical in continuous freezing systems to provide a flow of low temperature air, or other gas, countercurrent to the flow of products therethrough, the introduction of vaporized cryogen into this flow upstream of the product to be frozen further reduces the temperature of the gas and hence further increases freezing capacity.

Where, typically, the freezer comprises means for circulating the atmosphere within the enclosure, and into contact with the products being conveyed therethrough, and a heat exchanger operable to withdraw heat from the atmosphere circulating within the enclosure so as to maintain the interior of the enclosure below ambient temperature, means are preferably provided for sensing the temperature of the atmosphere as it is circulated into contact with the heat exchanger together with means operable, in response to the sensed temperature, to control the directing means so as to vary the amount of vaporized cryogen introduced into the enclosure and/or to vary the amount of cryogen sprayed onto the products in the spray zone.

With such an arrangement, if the temperature at the inlet to the heat exchanger increases, such as would occur when the ambient temperature outside the enclosure increases, or product throughput is increased, the heat exchanger continues to operate at maximum capacity, but does not remove sufficient heat from the circulating air, causing the product to be insufficiently frozen. In such circumstances, the operation of the heat exchanger can be maintained at maximum efficiency by increasing the amount of cryogen sprayed onto the products and/or the amount of vaporized cryogen introduced into the enclosure.

If the heat exchanger inlet temperature decreases, such as when outside ambient temperature decreases, or product throughput decreases, it would be necessary to decrease the amount of cryogen sprayed onto the products and/or the amount of vaporized cryogen introduced into the enclosure so as to enable the heat exchanger to continue to operate at maximum efficiency without over freezing the products and/or causing the heat exchanger to shutdown.

Advantageously in accordance with a further embodiment of the present invention, a means is also provided for introducing a breathable liquid cryogen, which may be the same as that cryogen sprayed onto the products, directly into the enclosure. This means is preferably located so as to introduce liquid cryogen into the region adjacent the enclosure outlet and near the ceiling of the enclosure. Introducing cryogen directly into the enclosure in this way quickly reduces the temperature within the enclosure, and enables the apparatus to be brought into operation quickly. It can also be used to assist operation of the freezer when there is a sudden peak in product throughput or when the ambient temperature outside the enclosure rises significantly.

Turning to the drawings, in the apparatus shown in FIG. 1, products are conveyed into an insulated freezer enclosure 2 through an inlet 4 and are conveyed (as shown by the solid arrows) through a helical path, or stack, 6, as is known in the art, before being conveyed, in the frozen state, out of the enclosure 2 via outlet 8.

A heat exchanger, or evaporator, 10 is provided to maintain the temperature within the enclosure 2 significantly below the ambient temperature outside the enclosure 2. A fan 12 is provided to circulate the atmosphere within the enclosure 2 and through the heat exchanger 10 (the gaseous flows within the enclosure 2 being shown by double headed arrows in FIG. 1). Fan 12 circulates the cold air from the heat exchanger 10 into the top of the stack 6 to exit from the bottom thereof and thence back through heat exchanger 10.

Figure 2:
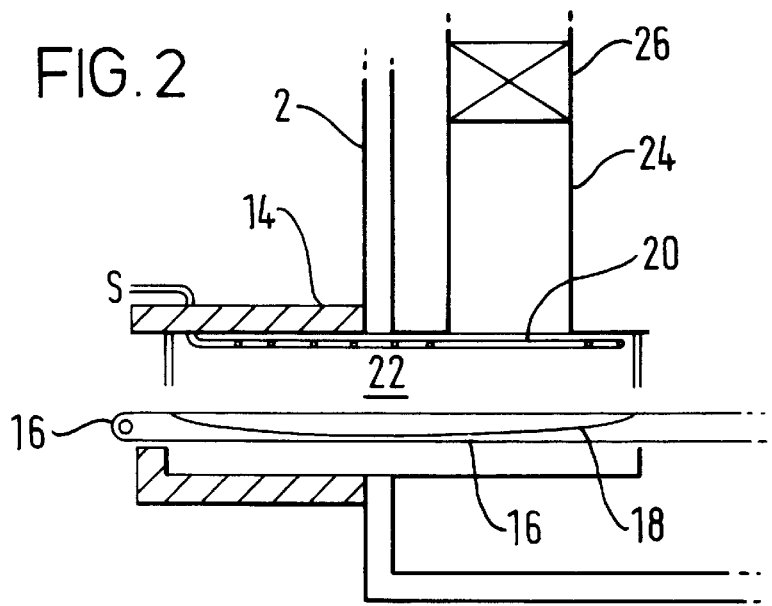
FIG. 2 is an enlarged schematic drawing of a portion of the apparatus of FIG. 1.

In accordance with the invention, a canopy 14, as shown in see FIG. 2, is provided at the inlet 4 to the enclosure 2. This canopy, which is typically about 2.5 m in length, 0.75 m in width and 1.5 m in height, extends either side of the wall of the insulated enclosure 2, and is insulated on that portion extending outside the enclosure 2. Running through the canopy 14 is a conveyor belt 16, which may feed onto or may comprise part of the conveyor (not shown) for conveying the products along the helical stack 6. The belt 16 is supported within the canopy 14 by PTFE runners 18. A cryogenic liquid spray system 20 is disposed within canopy 14 to spray a breathable liquid cryogen from a source S onto the products conveyed along belt 16 and through canopy 14 in a spray zone 22.

The breathable liquid cryogen is preferably a mixture of liquid oxygen and liquid nitrogen with an absolute oxygen concentration approaching that of air, namely about 21 mol %. The use of such a breathable cryogen is preferred since it presents none of the safety hazards which are associated with other cryogens, such as nitrogen or carbon dioxide. Using a breathable cryogen means that maintenance can be carried out while the equipment is still in use. In certain circumstances it may be preferred to have a lower concentration of oxygen in the liquid cryogen so as to reduce fire risk; the lowest concentration of oxygen in an oxygen/nitrogen mix which is breathable is about 14 mol %. An oxygen concentration of between about 15 mol % and about 18 mol % provides a suitable compromise between breathability and fire risk reduction, allowing for any mixing errors or enrichment of the mixture that may occur during storage. Because it is possible to produce a liquid oxygen/liquid nitrogen mixture which contains very little water vapor, the use of such a cryogen helps prevent the apparatus from icing up.

As cryogen is sprayed onto the product conveyed along the belt 16 a proportion of the liquid cryogen is vaporized. This vaporized cryogen is withdrawn from the spraying zone through stainless steel ducting 24 by a variable speed fan 26, which will be further described below. The flow of vaporized cryogen exits the ducting 24 and mixes with the flow of air circulating within enclosure 2 (due to operation of fan 12) in region 28, at the top of the stack 6 and adjacent the outlet 8 to enclosure 2. This vaporized cryogen significantly reduces the temperature of the air circulating in region 28 and thus adds to the freezing capacity provided by heat exchanger 10.

In order to reduce the start-up time of the freezer, a second cryogenic spray system 30 supplied with a breathable liquid cryogen from a source S (which may be the same source as that for the breathable liquid cryogen supplied to spray zone 22) is provided and disposed so as to inject liquid cryogen directly into the enclosure 2 towards the top thereof and above the top of the stack 6. The liquid cryogen injected by spray system 30, which may inject the cryogen in liquid form or which, more preferably, incorporates an evaporator (not shown) so as to introduce vaporized cryogen into the enclosure 2, mixes with the air circulating within the enclosure 2 and quickly reduces the temperature inside the enclosure 2. This second spray system 30 may also be employed to boost the operation of the freezer when an unusually high load is placed on it, such as when there is an unusually high ambient temperature outside the enclosure 2, and/or when there is an unusually high throughput of product.

Figure 3:
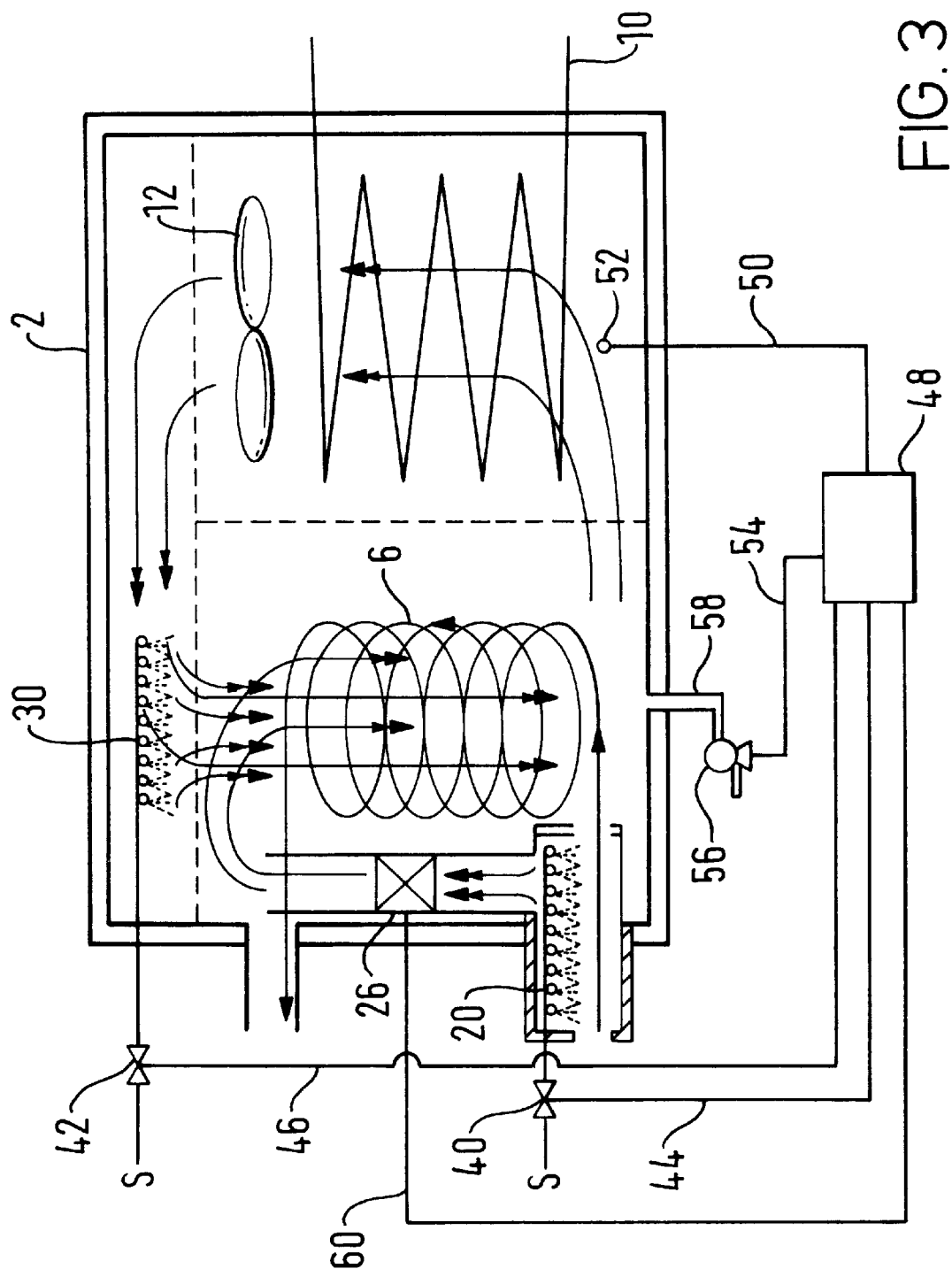
FIG. 3 is a schematic view of the control system for operation of the apparatus of FIG. 1.

Referring now to FIG. 3, a control system for the apparatus of FIGS. 1 and 2 is shown schematically and so as to illustrate the method of operation in accordance with the present invention. The rate of supply of liquid cryogen from source S to spray systems 20, 30 is controlled by variable control valves 40, 42 respectively. Valves 40, 42, each of which is actuated by a proportional integral differential (PID) controller (not shown), are connected by lines 44, 46, respectively, to controller 48, a programmable logic controller incorporating a paradigm control panel or the like. Controller 48 is also connected, via line 50 to temperature sensor 52 adjacent the inlet to heat exchanger 10, and via line 54 to venting means 56 for venting air from beneath the bottom of stack 6 through vent 58. Controller 48 is also connected, via line 60 (and through a fan speed controller which is not shown) to variable speed fan 26.

The operation of the freezer is as follows. At start-up of the freezer, cryogen is injected into the enclosure 2 through both spray systems 20, 30 according to the parameters initially entered into the control panel 48. Initially, the flow rate through both variable control valves 40, 42 will be at a maximum. As the temperature at the inlet to the heat exchanger 10 sensed by sensor 52 decreases towards the required freezer operating temperature, the variable control valves 40, 42 will be actuated by control panel 48 and PID controllers so as to reduce the flow rate until the required temperature is reached. When the required temperature is reached within enclosure 2 both valves 40, 42 will shut off. Once products are fed into the enclosure 2 to be frozen, control valve 40 will permit sufficient flow of cryogen through spray system 20 to provide crust freezing of the products. As the stack 6 becomes full of products, the heat exchanger 10 will gradually reach its maximum operating capacity. This will be apparent according to the readings from temperature sensor 52. At this point, controller 48 actuates variable speed fan 26 so as to withdraw vaporized cryogen from the vaporisation zone 22 for circulation through the stack 6. At the same time, and particularly if more products are loaded into the stack 6 or if the rate of movement of products through the stack 6 is increased, control valve 40 may open so as to allow more liquid cryogen to be sprayed by system 20.

In the event of a sudden increase in temperature sensed by sensor 52 during normal operation, the controller 48 may actuate valve 42 so as to inject cryogen directly into the enclosure 2. Additionally or alternatively, controller 48 may actuate pumping means 56 to draw relatively warm air from the bottom of the stack 6 via vent 58 and vent this to atmosphere.

As will be apparent to those skilled in the art, the apparatus in accordance with the invention may be embodied, either when constructing new freezer systems or as a retrofit to an existing mechanical freezer. In the following example tests were carried out on a mechanical spiral freezer processing fish fillets to be frozen to a temperature of less than −20° C.

EXAMPLE

A stainless steel canopy approximately 2.5 m in length by approximately 0.75 m in width by approximately 1.5 m in height was installed at the product inlet to a mechanical spiral freezer, as shown schematically in FIGS. 1, 2 and 3 and as described above. Stainless steel ducting was installed inside the freezer so as to duct the evolved gaseous cryogen from the spray zone into the top of the freezer. The ductwork incorporated a 350 mm diameter variable speed fan to move the cryogen into the freezer. The cryogenic liquid was injected into the spray zone via a spray system installed above the solid belt conveyor, and in operation the fan speed was adjusted to duct the evolved cryogen from the spray zone into the top of the freezer without drawing in any warm air through the spray zone. A liquid cryogen comprising 21 mol % nominal oxygen, remainder nitrogen was sprayed onto the fish fillets conveyed into the freezer. The freezer had a base product flow rate, i.e. a maximum product throughput rate without spraying any liquid cryogen, of approximately 380 kg/hr. Four tests were then carried out with an increased product flow rate, and liquid cryogen was sprayed onto the products so as to obtain products frozen to the same degree. Table 1 shows the theoretical cryogen flow rate obtained from a computer model and the results of the actual cryogen flow rate obtained from the test. The table also shows the actual product flow and the percentage increase in freezer capacity.

TABLE 1

|  | Product flow rate (kg/hr) | Calculated cryogen flow rate (kg/hr) | Actual cryogen flow rate (kg/hr) ± 75 kg/hr | Increase in capacity (%) |
| --- | --- | --- | --- | --- |
| Base Load | 380 |  |  |  |
|  | 415 | 205 | 300 | 10% |
|  | 520 | 288 | 300 | 37% |
|  | 640 | 400 | 350 | 68% |
|  | 670 | 457 | 450 | 75% |

From the results above it can be determined that the maximum increase in product flow rate was 75%. There was a marginal difference in the temperature of the product of the outlet so the maximum increase in product flow rate would actually be less than 75%. To increase the product flow rate by 75% a cryogen flow rate of approximately 450 kg/hr was required which give a liquid to product ratio of 1.55 for the increase in extra freezing capacity.

It was determined that the average air temperature within the freezer enclosure when the variable speed fan (26) was running at 20 Hz was −37° C. and for the period of time when the fan was switched off the average air temperature was approximately −35° C. This indicates that the vaporized cryogen ducted from the spray zone cooled the circulating air by approximately 2° C.

During these tests there was no evidence of the heat exchanger, or evaporator, backing off during any of the product trials, and there was minimal evidence of ice build up in the freezer.

The apparatus and methods of the invention provides significant advantages, namely: increased throughput of product to be frozen; a reduction in freezer start-up times; the capacity to easily compensate for changes in ambient temperature; the capacity of the freezer to handle increases in peak product demand effectively; and a reduction in dehydration losses. In addition, the apparatus of the invention is advantageous in that there is a low capital cost for retrofitting it to an existing mechanical freezer. Although described above in relation to the freezing of food products, it will be apparent to those skilled in the art that the principles of the present invention are equally applicable to products other than food products which are frozen in large numbers in a continuous process. Whereas stainless steel is preferred for the ductwork, for its thermal and hygiene qualities, in food applications, other materials may be more suitable in non-food freezing systems.

We claim:

1. An apparatus for freezing food products comprising an insulated enclosure, means for maintaining the interior of the enclosure below ambient temperature and means for conveying products through the enclosure via an inlet and an outlet thereof so as to reduce the product temperature, a canopy defining a cryogen spray zone being provided at the enclosure inlet, a means, disposed within the canopy, for spraying the products with a breathable liquid cryogen as they are conveyed through the spray zone and into the enclosure and a directing means for directing at least some of the liquid cryogen, which is vaporized after coming into contact with the products in the canopy, so as to introduce at least some of the vaporized cryogen into the enclosure adjacent the outlet thereof.

2. An apparatus in accordance with claim 1, wherein the directing means comprises a variable speed fan housed in ducting located within the enclosure.

3. An apparatus in accordance with claim 1, wherein the means for maintaining the interior of the enclosure below ambient temperature comprises means for circulating the atmosphere within the enclosure, and into contact with the products being conveyed therethrough, and a heat exchanger operable to withdraw heat from the atmosphere circulating within the enclosure.

4. An apparatus in accordance with claim 3, further including means for sensing the temperature of the atmosphere as it is circulated into contact with the heat exchanger and means operable, in response to the sensed temperature, to control the directing means so as to vary the amount of vaporized cryogen introduced into the enclosure.

5. An apparatus in accordance with claim 1 further comprising means for varying the amount of cryogen sprayed onto the products at the enclosure inlet.

6. In a method of freezing products comprising conveying them through a mechanical conveyor freezer comprising an insulated enclosure having an inlet and an outlet, means for circulating the atmosphere within said enclosure and a heat exchanger operable to withdraw heat from the atmosphere circulating within said enclosure, the improvement comprising spraying a breathable liquid cryogen onto the products as they are conveyed into the inlet of said freezer and directing at least some of the cryogen which is vaporized through contact with the products so as to introduce it into the enclosure adjacent the outlet thereof for circulation therein.

7. A method in accordance with in claim 6 further including the step of sensing the temperature of the atmosphere within the enclosure as it circulates towards the heat exchanger and varying the amount of breathable liquid cryogen sprayed onto the products in response thereto to maintain a predetermined temperature in said enclosure.

8. A method in accordance with claim 7 additionally including the step of spraying a breathable liquid cryogen directly into the enclosure, wherein said liquid cryogen is sprayed into the enclosure in response to the sensing of temperature in said enclosure to maintain a predetermined temperature therein.

9. An apparatus for freezing food products comprising an insulated enclosure, means for maintaining the interior of the enclosure below ambient temperature and means for conveying products through the enclosure via an inlet and an outlet thereof so as to reduce the product temperature, a canopy defining a cryogen spray zone being provided at the enclosure inlet, a means, disposed within the canopy, for spraying the products with a breathable liquid cryogen as they are conveyed through the spray zone and into the enclosure and a means for introducing a breathable liquid cryogen directly into the enclosure wherein the introducing means is located so as to introduce cryogen into the region adjacent the enclosure outlet.

10. In a method of freezing products comprising conveying them through a mechanical conveyor freezer comprising an insulated enclosure having an inlet and an outlet, means for circulating the atmosphere within said enclosure and a heat exchanger operable to withdraw heat from the atmosphere circulating within said enclosure, the improvement comprising spraying a breathable liquid cryogen onto the products as they are conveyed into the inlet of said freezer and spraying said breathable liquid cryogen directly into the enclosure into the region adjacent the enclosure outlet.

* * * * *